United States Patent
Schlutius (10) Patent No.: US 10,821,913 B2
(45) Date of Patent: Nov. 3, 2020

(54) PARTITION WALL SUBASSEMBLY

(71) Applicant: Ford Global Technologies, LLC, Dearborn, MI (US)

(72) Inventor: Karsten Schlutius, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 119 days.

(21) Appl. No.: 16/368,998

(22) Filed: Mar. 29, 2019

(65) Prior Publication Data

US 2019/0316389 A1   Oct. 17, 2019

(30) Foreign Application Priority Data

Apr. 13, 2018   (DE) .......................... 10 2018 205 624

(51) Int. Cl.
| | |
|---|---|
| *B60R 5/04* | (2006.01) |
| *B60R 13/01* | (2006.01) |
| *B60R 7/02* | (2006.01) |
| *E05B 85/10* | (2014.01) |
| *E05B 1/00* | (2006.01) |

(52) U.S. Cl.
CPC .............. *B60R 13/013* (2013.01); *B60R 5/04* (2013.01); *B60R 7/02* (2013.01); *E05B 1/0015* (2013.01); *E05B 85/10* (2013.01)

(58) Field of Classification Search
CPC .... B60R 5/04; B60R 7/02; B60R 7/04; B60R 13/01; B60R 13/013; B62D 25/20; B62D 25/2054; E05B 1/0015; E05B 5/00
USPC ............................................. 296/37.1, 37.16
See application file for complete search history.

(56) References Cited

U.S. PATENT DOCUMENTS

| | | |
|---|---|---|
| 8,382,182 B2 | 2/2013 | Stossel |
| 8,534,737 B2 * | 9/2013 | Torres ..................... B60R 5/044 |
| | | 296/37.16 |
| 8,678,462 B2 | 3/2014 | Simon et al. |

(Continued)

FOREIGN PATENT DOCUMENTS

| | | | |
|---|---|---|---|
| DE | 102014005029 A1 | 11/2014 | |
| EP | 0970851 A1 | 1/2000 | |
| JP | 2019156006 A * | 9/2019 | ............... B60R 5/04 |

OTHER PUBLICATIONS

"Cargo Compartment Load Floor Panel Latch Handle Broken," Service Bulletin, www.wk2jeeps.com/tsb/tsb_wk2_2301215, Mar. 31, 2015, 7 pages.

*Primary Examiner* — Jason S Daniels
(74) *Attorney, Agent, or Firm* — David Coppiellie; Price Heneveld LLP (57) ABSTRACT

A partition wall subassembly having a gripping unit for a partition wall, having first and second gripping portions which in the assembled state extend from mutually opposing sides into a recess of the partition wall which extends along a passage axis, are connected to each other within the recess and each have an access opening. In order to provide an ergonomically advantageous gripping unit which can be produced in a cost-effective manner for a partition wall, there is provision for the two gripping portions to be constructed identically and, in the assembled state, arranged in a rotationally symmetrical manner with respect to an axis of symmetry, wherein the access openings are constructed in a non-symmetrical manner with respect to a center plane which is formed by the axis of symmetry and the passage axis.

20 Claims, 6 Drawing Sheets

(56) References Cited

U.S. PATENT DOCUMENTS

| | | |
|---|---|---|
| 9,062,474 B2 | 6/2015 | Ibrahim et al. |
| 10,434,955 B2 * | 10/2019 | Ono .......................... B60R 5/04 |
| 10,494,842 B2 * | 12/2019 | Lepper ................. E05B 65/006 |
| 2006/0165972 A1 * | 7/2006 | Chimelak ................. B32B 5/18 |
| | | 428/319.1 |
| 2010/0133858 A1 | 6/2010 | Huck |
| 2016/0144903 A1 | 5/2016 | Cassiani |

* cited by examiner

PARTITION WALL SUBASSEMBLY

FIELD OF THE INVENTION

The present invention generally relates to a partition wall, and more particularly relates to a partition wall subassembly having a gripping unit for a partition wall.

BACKGROUND OF THE INVENTION

In different fields, partition or intermediate walls or intermediate floors are used in order to sub-divide a specific space. Often these partition walls are constructed to be movable or removable, for example, in order to be able to undertake the subdivision as required. An example is an intermediate floor for a storage space of a motor vehicle which can be lifted or removed as necessary, either in order to enable access to a region of the storage space below or in order to be able to use the entire storage space. It is also conceivable for the intermediate floor to have two different sides, one side of which has an attractive appearance and feel (for example, with a felt-like coating), while the other side can be constructed in a particularly robust and, for example, easily washable manner. In order to be able to handle the intermediate floor, it normally has a gripping unit which can be used from both sides. It is possible to use as a gripping unit, for example, pulling loops which can be produced in a cost-effective manner, but which may constitute an impediment as long as they are not being used. In addition, embodiments are known in which a gripping unit is composed of several parts and is inserted into a recess inside the intermediate space. Although such gripping units advantageously ergonomically fit the shape of the intermediate floor, as a result of the plurality of different parts they are comparatively complex and costly to produce.

DE 10 2014 005 029 A1 discloses a gripping unit for a reversible loading floor for a storage space of a passenger vehicle, which has at each of the two outer sides a gripping element which is supported on the gripping unit so as to be able to be adjusted between a respective storage position and an actuation position in order to raise the reversible loading floor. The gripping unit comprises a locking mechanism having a locking element which can be actuated by both gripping elements. The gripping components may in this instance in particular be constructed as identical components.

U.S. Pat. No. 8,678,462 B2 sets out a subassembly for a motor vehicle, having a storage space floor which is connected to a handle. The handle can be adjusted between a first and a second position. At least one support element is connected to the storage space floor. When the handle is located in the first position, the support element is retracted and, when the handle is located in the second position, the support element is deployed. A base wall supports the support element in the deployed position in such a manner that the storage space floor is retained in a lateral position. When the support element is retracted, the base wall supports a lower side of the storage space floor.

U.S. Pat. No. 9,062,474 B2 A discloses a storage space covering unit having a reversible storage space cover and a sliding member which is movably arranged on the storage space cover and which in a deployed position locks the storage space cover in the storage space. In this instance, at two opposing sides of the storage space cover there are provided handles which are pivotably constructed and which are coupled to the piston in such a manner that it can be adjusted by pivoting one of the handles in each case.

U.S. Patent Application Publication No. 2010/0133858 A1 sets out a handle for a storage space floor having a gripping opening which has a handling surface, a gripping shell which surrounds the gripping opening, and a gripping opening flap which is configured to close the gripping opening and which is pivotably arranged on the gripping shell.

U.S. Patent Application Publication No. 2016/0144903 A1 discloses a movable intermediate floor for a luggage compartment of a motor vehicle. The intermediate floor has an upper surface which is provided as a shelf for luggage, and a lower surface which is provided to face in the direction of a floor of the luggage compartment. The intermediate floor has a rear portion with a through-opening which is sized in such a manner that a user can reach through it in order to grip the rear portion. There is further provided a strip which in a rest position closes the through-opening, wherein at least one rear portion of the strip can be resiliently deformed by the user in such a manner that he/she releases the through-opening.

U.S. Pat. No. 8,382,182 B2 A discloses a storage space for a motor vehicle having a wall which defines a storage space and an access opening to the storage space. A covering element has a free end and an end which is pivotably secured to the wall. The wall has a support region which forms a projection and which at least partially surrounds the access opening, wherein the free end of the covering element is arranged in a covering position on the support region in order to cover the access opening.

EP 0 970 851 A1 discloses a gripping arrangement which is for a cover which is located on the floor of the luggage compartment or storage space of a motor vehicle and which covers a storage space below the cover and which can be folded up on at least one curved gripping member. The at least one curved gripping member rests as a pulling handle in the rest position flush with the floor in a recess in the cover and can be pivoted out of the recess into a gripping position.

In view of the prior art set out, the provision of a gripping unit which can be produced in an ergonomically advantageous and cost-effective manner for a partition wall, in particular for an intermediate floor of a motor vehicle, certainly leaves room for improvement. It would be desirable to provide an ergonomically advantageous gripping unit which can be produced in a cost-effective manner for a partition wall.

SUMMARY OF THE INVENTION

According to one aspect of the present invention, a partition wall subassembly having a gripping unit for a partition wall is provided. The partition wall subassembly includes first and second gripping portions which, in an assembled state, extend from mutually opposing sides into a recess of the partition wall which extends along a passage axis and are connected to each other within the recess. The first and second gripping portions are constructed identically and, in the assembled state, arranged in a rotationally symmetrical manner with respect to an axis of symmetry. The first and second access openings are constructed in a non-symmetrical manner with respect to a center plane which is formed by the axis of symmetry and the passage axis.

According to another aspect of the present invention, a partition wall subassembly having a gripping unit for a partition wall for a storage space of a motor vehicle is provided. The partition wall subassembly includes first and second gripping portions which, in an assembled state, extend from mutually opposing sides into a recess of the partition wall which extends along a passage axis and are connected to each other within the recess. The first and second gripping portions are constructed identically and, in the assembled state, arranged in a rotationally symmetrical manner with respect to an axis of symmetry. The first and second access openings are constructed in a non-symmetrical manner with respect to a center plane which is formed by the axis of symmetry and the passage axis. The gripping portions are directly connected to each other in the assembled state, wherein each of the first and second gripping portions has at least a pair of connection elements having a first connection element and a second opposing connection element with respect to the center plane, wherein in the assembled state a first connection element of the first gripping portion cooperates with a second connection element of the second gripping portion.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Additional features and advantages of the invention will be set forth in the detailed description which follows and will be apparent to those skilled in the art from the description, or recognized by practicing the invention as described in the following description, together with the claims and appended drawings.

Figure 1:
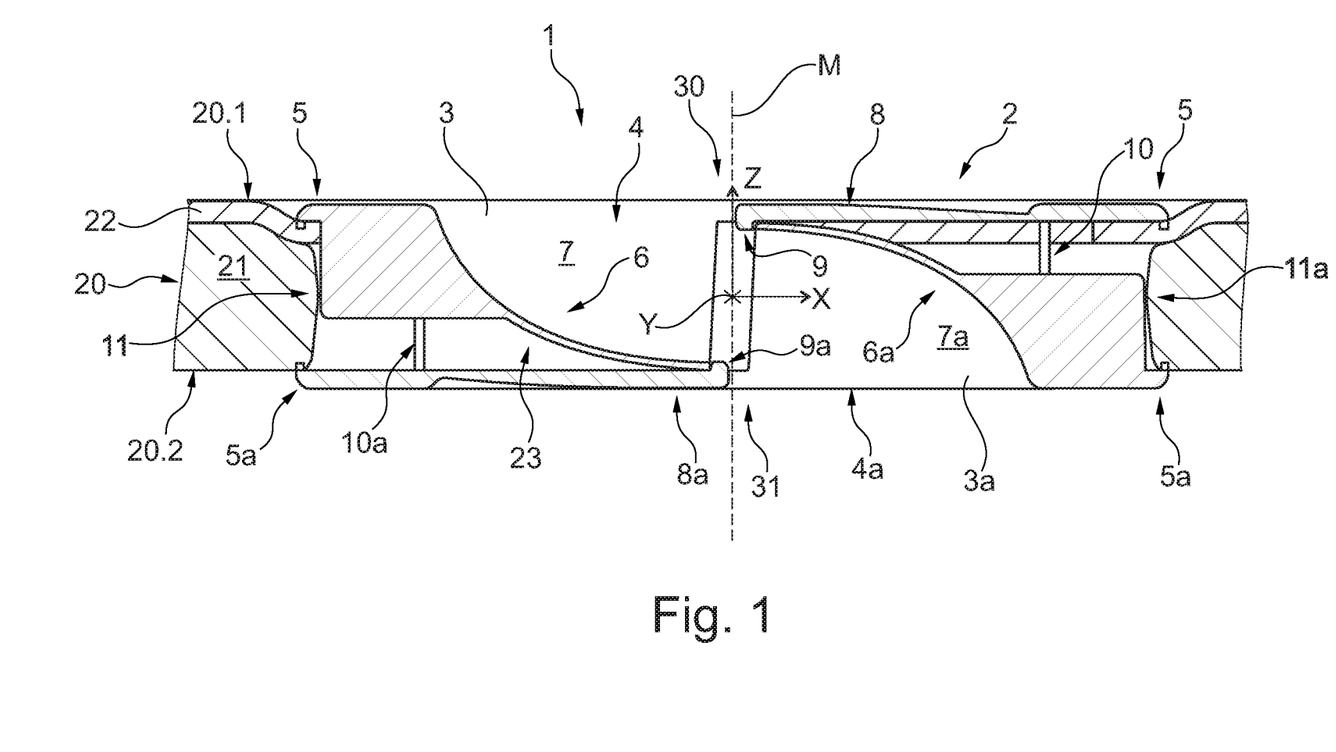
FIG. 1 is a sectioned view of a partition wall subassembly, according to one embodiment.

FIG. 1 is a side view of a partition wall subassembly 1 according to one embodiment. It is possible to see an intermediate floor 20 for a luggage compartment of a motor vehicle, which has a construction plate 21 which comprises, for example, plastics material or fiber-composite material and a coating 22 which is laminated or adhesively-bonded thereto at a first side 30 and which, for example, may be constructed as a type of felt. The intermediate floor 20 has a recess 23 which extends along a passage axis Z and in which from the first side 30 a first gripping portion 3 of a gripping unit 2 is introduced, while from an opposing second side 31 a second gripping portion 3a is introduced into the recess 23. The two gripping portions 3, 3a are connected to each other inside the recess 23. Each gripping portion 3, 3a has an access opening 4, 4a for a user through which the user can reach into the gripping unit 2 in order to handle it and the partition wall subassembly 1 as a whole. The two gripping portions 3, 3a are ideally produced using an injection-molding method from plastics material and may be constructed identically. However, they are rotated relative to each other with respect to an axis of symmetry Y through 190° so that the gripping unit 2 is on the whole rotationally symmetrical with respect to the axis of symmetry Y.

In this instance, each access opening 4, 4a is arranged asymmetrically with respect to a center plane M formed by the passage axis Z and the axis of symmetry Y. More specifically, each access opening 4, 4a is arranged at one side of the center plane. A minor axis X extends perpendicularly to this center plane M. The first gripping portion 3 has a flange-like retention portion 5 which is arranged on a first surface 20.1 of the intermediate floor 20 and forms with the intermediate floor 20 a positive-locking connection in the direction of the passage axis Z. A handling portion 6 is connected to the retention portion 5, partially directly and partially by two side portions 7 which adjoin each other at both sides in the direction of the axis of symmetry Y and which extend in the direction of the passage axis Z. The handling portion 6 is provided to be gripped by a user using his hand and can be reached via the access opening 4a of the second gripping portion 3a. The second gripping portion 3a naturally also has, as a result of its identical construction, a retention portion 5a which is arranged on a second surface 20.2, a handling portion 6a and side portions 7a.

Furthermore, the first gripping portion 3 has a covering portion 8 which adjoins the access opening 4. It is arranged in the direction of the passage axis Z in front of the handling portion 6a of the second gripping portion 3a and covers it (when viewed from the first side 30) completely. The side portions 7, 7a of the two gripping portions 3, 3a are in abutment with each other and form a positive-locking connection with each other. The covering portion 8 of the first gripping portion 3 is also in abutment with the handling portion 6a of the second gripping portion 3a, wherein a projection 9 which extends in the direction of the passage axis Z forms a positive-locking connection with the handling portion 6a in the direction of the minor axis X. When a user grips the gripping unit 2 through the access opening 4 of the first gripping portion 3, by gripping the handling portion 6a of the second gripping portion 3a he/she can apply a pulling force in the direction of the first side 30. This pulling force is transmitted by the connection of the handling portion 6a to the retention portion 5a and the positive-locking connection thereof with the intermediate floor 20 directly thereto. That is to say, the corresponding pulling force does not act (or only to a small degree) on the first gripping portion 3 and consequently cannot pull it out of the recess 23. Accordingly, the user, by pulling on the handling portion 6 of the first gripping portion 3 in the opposite direction, cannot pull it in the direction of the second side 31 from the recess 23. Furthermore, the covering portion 8 of the first gripping portion 3 prevents the user from applying a pressing force in the direction of the second side 31 to the handling portion 6a of the second gripping portion 3a. This is because the handling portion 6a is covered by the covering portion 8 of the first gripping portion 3 and consequently shielded against a corresponding pressing force.

For the reasons set out, the user cannot unintentionally pull or press any of the gripping portions 3, 3a out of the recess 23. This would be the case even if there were no specific connection between the gripping portions 3, 3a with connection elements 10, 10a, 11, 11a. However, the first gripping portion 3 has a series of resilient locking elements 10 and a corresponding number of receiving elements 11. In this instance, a locking element 10 and a retention element 11 can be associated in each case with a pair. Of course, the second gripping portion 3a has corresponding locking elements 10a and receiving elements 11a. When the gripping unit 2 is assembled, a locking element 10 of the first gripping portion 3 is joined to a retention element 11a of the second gripping portion 3a and a locking projection or a pin of the locking element 10 engages in a provided recess of the receiving element 11a. A corresponding engagement is carried out between locking elements 10a of the second gripping portion 3a and receiving elements 11 of the first gripping portion 3.

Figure 2:
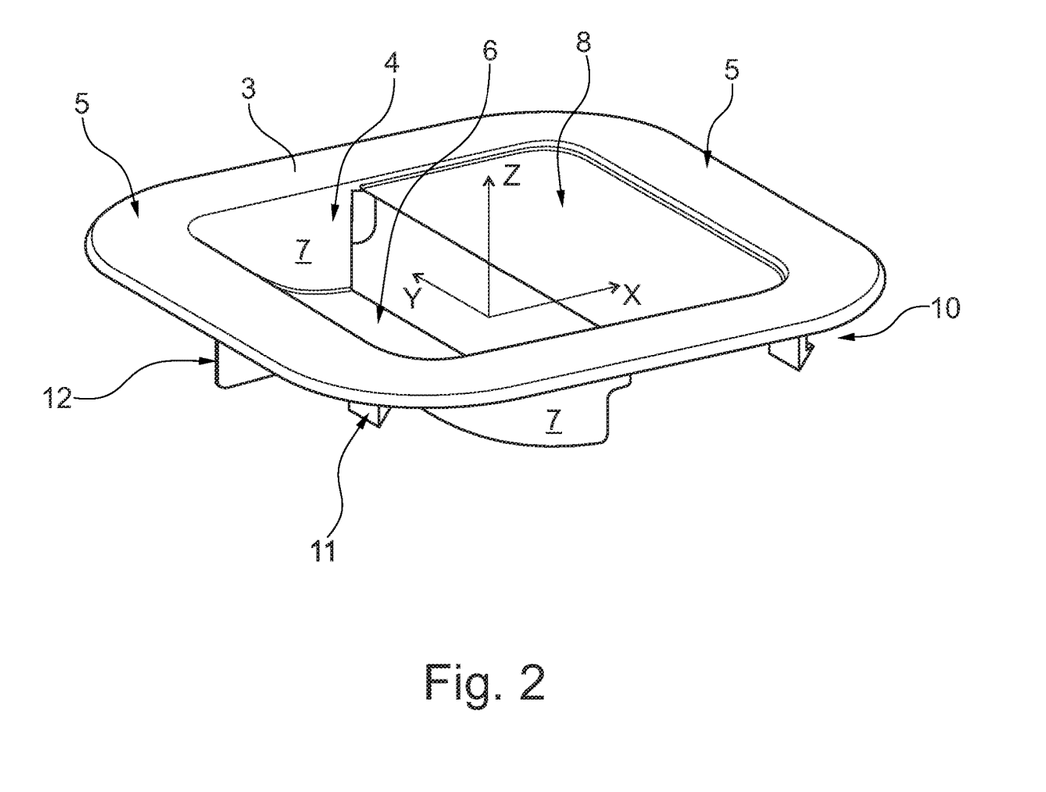
FIG. 2 is a perspective view of a gripping portion of the partition wall subassembly from FIG. 1.
Figure 3:
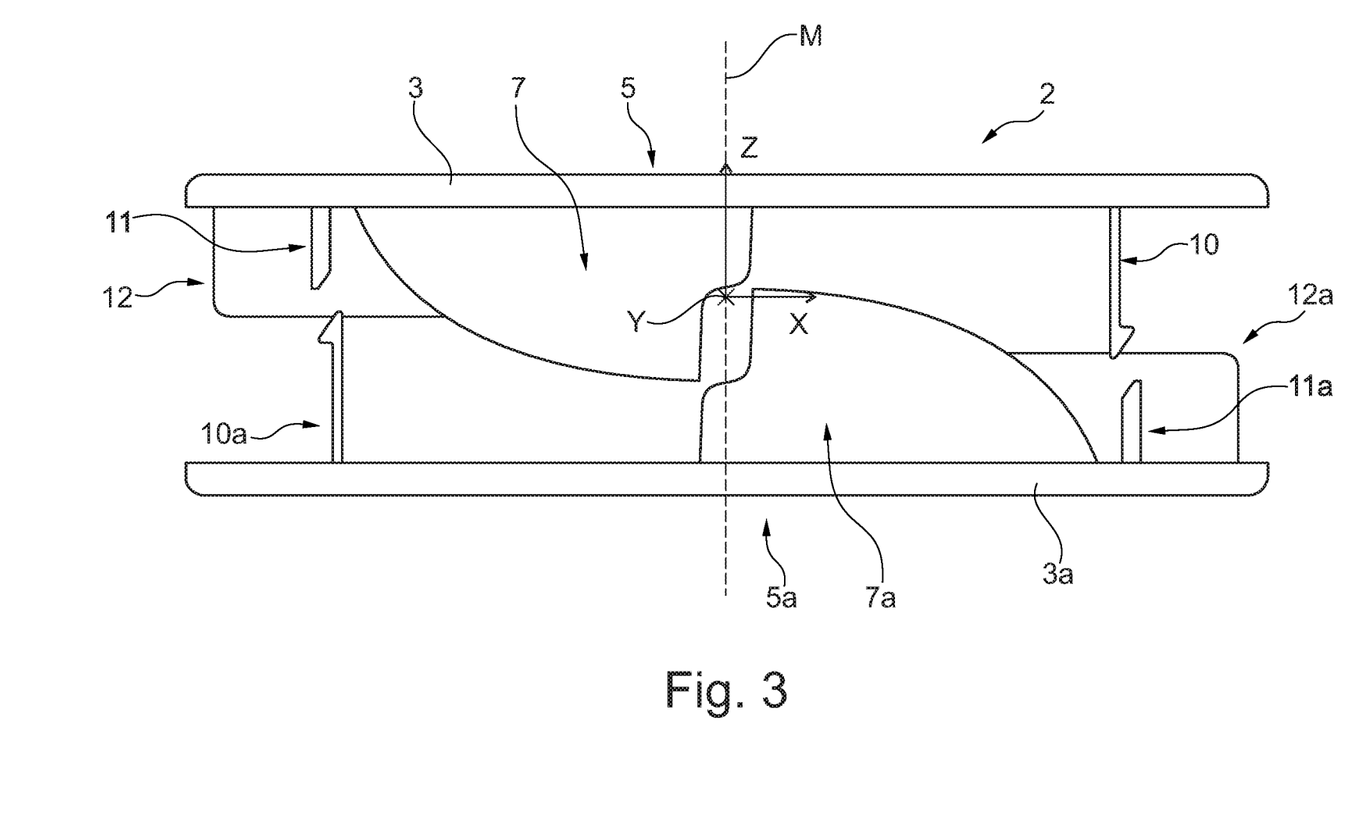
FIG. 3 is a side view of two gripping portions of the partition wall subassembly prior to assembly.
Figure 4:
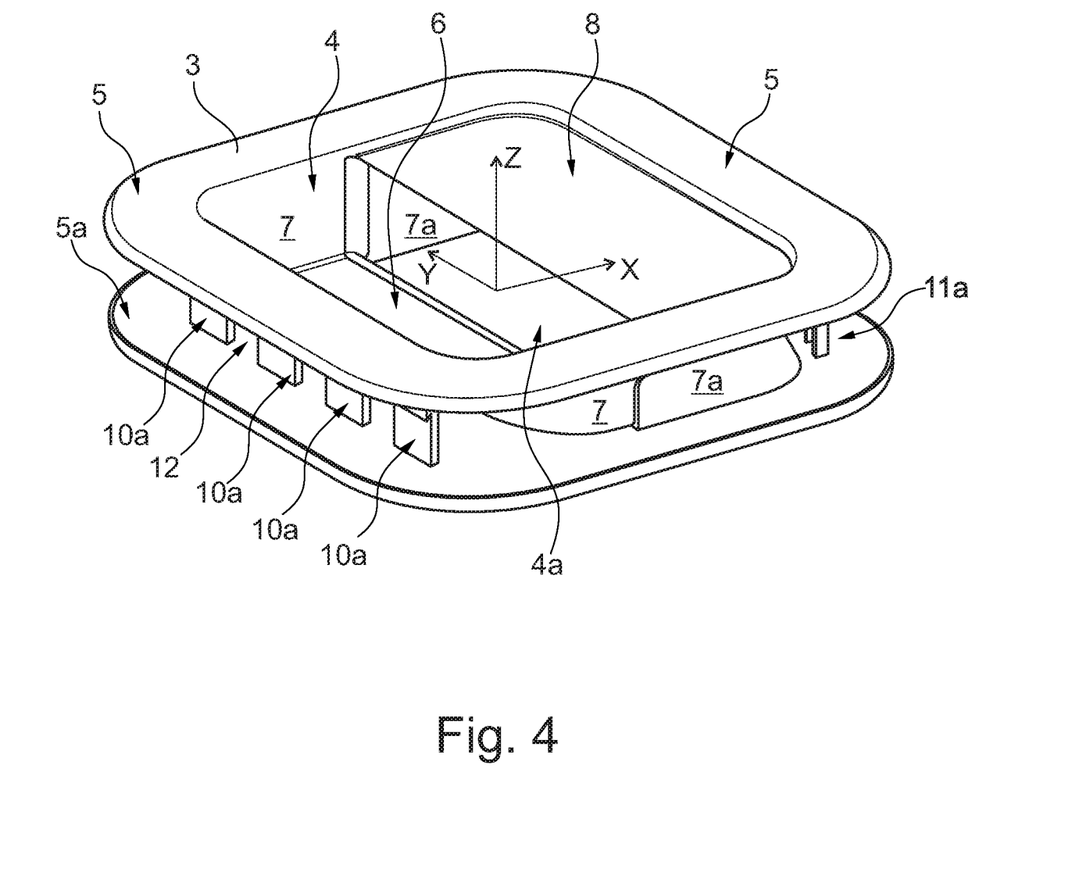
FIG. 4 is a perspective illustration of a gripping unit which is composed of the two gripping portions.
Figure 5:
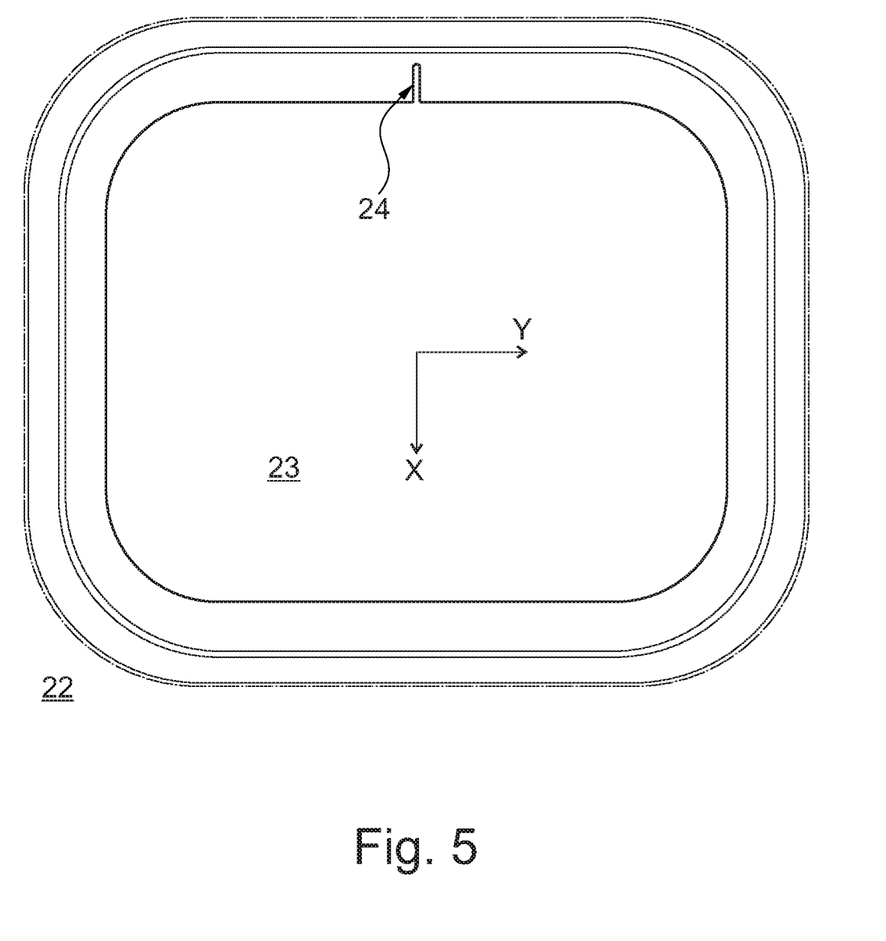
FIG. 5 is a plan view of a coating of an intermediate floor of the partition wall subassembly.
Figure 6:
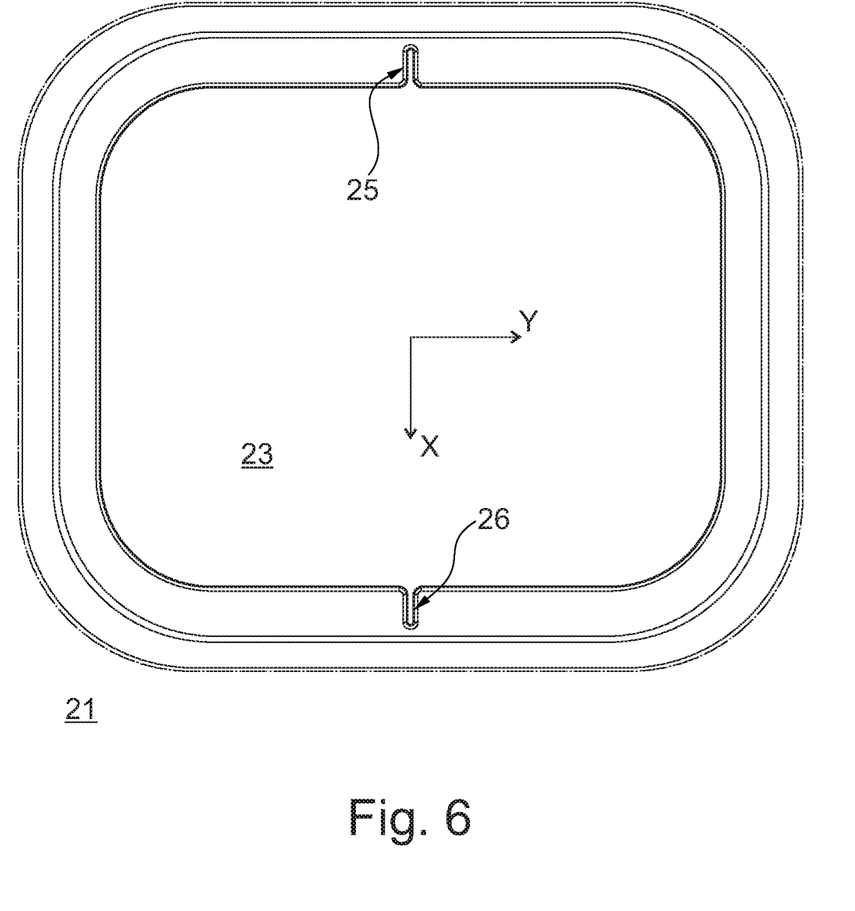
FIG. 6 is a plan view of a construction plate of the intermediate floor.

As can be seen in particular in FIGS. 1 and 2, the first gripping portion 3 has a rib-like orientation element 12 which protrudes with respect to the retention portion 5 in the direction of the passage axis Z and which in the assembled state engages with an incision 24 which is formed at the edge of the recess 23. The shape of the orientation element and the shape of the incision 24 are in this instance complementary. As can be seen in FIG. 5, which shows a plan view of the coating 22 of the intermediate floor 20, the incision 24 is arranged only at one side of the recess 23 so that an orientation of the first gripping portion 3 and consequently also of the entire gripping unit 2 with respect to the intermediate floor 20 is thereby predetermined. FIG. 6 is a plan view of the construction plate 21, in which two symmetrically arranged incisions 25, 26 are provided. As can be seen in FIG. 1, they are required since the orientation element 12 protrudes along the passage axis Z as far as the region of the construction plate 21. Of course, the two incisions 25, 26 in the construction plate 21 do not have to be constructed to be continuous along the passage axis Z. For technical production reasons, however, a continuous construction is generally simpler to implement.

It should be noted that the features and measures set out individually in the following description can be combined with each other in any technically advantageous manner and set out other embodiments of the disclosure. The description further characterizes and specifies the partition wall subassembly, in particular in connection with the figures.

As a result of the disclosure, a partition wall subassembly having a gripping unit for a partition wall is provided. In this case, the term "partition wall" relates to any element which is constructed in the manner of a wall and which is used to sub-divide a space. The term implies in this instance no spatial orientation so that it also relates in particular to a horizontally extending element which could also be referred to as an intermediate floor. In particular, it may be a partition wall (or an intermediate floor) for the inner space of a motor vehicle, for example, an intermediate floor for a luggage compartment. The partition wall is normally at least partially constructed in a planar manner, but can also be at least partially constructed in an angled and/or curved manner. With regard to the materials of the partition wall, there are in the context of the invention no limitations, although with respect to better handling by a user and saving weight, which is advantageous particularly in the motor vehicle, lightweight materials are preferred or materials which enable a lightweight construction. In particular the partition wall may at least partially comprise plastics material, but where applicable also fiber-composite material. For example, in the case of an intermediate floor, a type of fleece or woven material may be arranged on one side, that is to say, for example, laminated. The gripping unit is provided for the partition wall, that is to say, in the assembled state, it is connected to the partition wall and serves to grip and handle the partition wall. The partition wall itself may or may not be part of the partition wall subassembly.

The gripping unit has a first and a second gripping portion which, in the assembled state, extend from mutually opposing sides into a recess of the partition wall which extends along a passage axis, are connected to each other within the recess and in each case have an access opening. The passage axis characterizes in this instance the direction in which the recess extends through the partition wall. In this instance, it is generally the direction which extends perpendicularly (that is to say, normally) with respect to the extent plane of the partition wall. The recess thus passes (along or in the direction of the passage axis) through the partition wall. The two gripping portions are thus sized in such a manner that they extend in the assembled state into the recess, from mutually opposing sides. It may be said that the first gripping portion extends from a first side into the recess and the second gripping portion extends from a second side. In the case of an intermediate floor, the opposing sides could also be referred to as the upper side and lower side.

Within the recess, the two gripping portions are connected to each other and form as a result of this connection the gripping unit. In this instance, each of the gripping portions has an access opening. The access opening is provided for a user to reach therein with his/her hand or at least one or more fingers in order to grip the gripping unit (and consequently the partition wall). Since the two gripping portions each have an access opening, the gripping unit is provided to be selectively gripped from one of the opposing sides of the partition wall. That is to say, in the case of an intermediate floor, it may be constructed as a reversible floor in which one side can be selectively arranged as an upper side or lower side. Regardless of the orientation of the intermediate floor, an access opening is arranged in the respective upper side. With regard to the materials of the two gripping portions, there are various options, for example, they could at least partially be produced from metal. With regard to a simple production (for example, by means of injection-molding) and a lightweight construction of the gripping unit and the partition wall subassembly, however, it is preferable for the gripping portions to be produced from plastics material.

According to one embodiment, the two gripping portions are constructed identically and, in the assembled state, arranged in a rotationally symmetrical manner with respect to an axis of symmetry, wherein the access openings are constructed in a non-symmetrical manner with respect to a center plane which is formed by the axis of symmetry and the passage axis. On the whole, the gripping unit (or at least the portion thereof which is formed by the gripping portions) is constructed in a rotationally symmetrical manner with respect to the axis of symmetry. The two gripping portions are constructed identically and arranged so as to be rotated through 180° relative to each other with respect to the axis of symmetry. The axis of symmetry may preferably extend perpendicularly to the passage axis. As a result of the identical construction of the gripping portions, in the context of the assembly of the gripping unit it is insignificant which gripping portion is associated with one side of the partition wall and which with the other side. If a center plane of the gripping unit is constructed and is formed or defined by the axis of symmetry and by the passage axis, the access openings are thus constructed asymmetrically with respect to this center plane. In particular, the respective access opening may be arranged at least for the most part or even completely on one side of the center plane. As a result of the rotationally symmetrical arrangement of the two identical gripping portions, the other access opening is then arranged at the other side of the center plane. An axis which extends perpendicularly to the center plane is referred to below as a minor axis.

The gripping unit according to the disclosure has two identical gripping portions and may in particular comprise these two identical gripping portions. As a result of the fact that identical gripping portions are used, the production is considerably simplified and the costs can be reduced. In the case of damage or wear of one of the gripping portions, in any case only one type of replacements parts is also required.

With the described rotationally symmetrical arrangement of two identical constructed gripping portions, it is in principle conceivable for the gripping portions to be connected to each other by one or more interposed elements which may act, for example, as a type of adapter. However, it is preferable for the gripping portions to be directly connected to each other in the assembled state. The assembly of the gripping unit and the production thereof are thereby simplified. Costs can also be reduced by where applicable only the two gripping portions having to be assembled in order to complete the gripping unit.

The gripping portions may be connected to each other in a non-positive-locking or positive-locking manner in the assembled state. An at least partially non-positive-locking connection could, for example, be produced as a clamping connection by a pin or other projection, which is constructed on a gripping portion, being clamped in a recess of the other gripping portion provided for this purpose. A positive-locking connection can be produced with respect to different directions. Since the two gripping portions are normally joined during assembly parallel with the passage axis, it is particularly desirable to produce a positive-locking connection in this direction, whereby an undesirable pulling-apart of the two gripping portions is prevented. This may be carried out, for example, by use of a locking connection, in which a resilient locking element has on one gripping portion a projection which extends transversely to the passage axis and which can be resiliently deflected and which engages in a recess provided in the other gripping portion. In principle, however, non-positive-locking and/or positive-locking connections are also conceivable and are produced indirectly by use of an intermediate additional element.

Advantageously, each gripping portion has at least a pair of connection elements having a first connection element and a second opposing connection element with respect to the center plane, wherein in the assembled state a first connection element of the first gripping portion cooperates with a second connection element of the second gripping portion. The first and second connection element may also be considered to complement each other, For example, the first connection element on the first gripping portion could be a pin and the second connection element a recess. As a result of the identical construction and the rotationally symmetrical arrangement, there is formed (rotated through 180° with respect to the axis of symmetry) on the second gripping portion an identical pin which then engages in the recess in the first gripping portion. Accordingly, the pin of the first gripping portion engages in a recess arranged in the second gripping portion. Normally, several pairs of such connection elements which can each be provided for a positive-locking and/or non-positive-locking connection are provided.

According to an advantageous embodiment, each gripping portion has a retention portion which is arranged on a surface of the partition wall and which forms with the partition wall a positive-locking connection in the direction of the passage axis. The retention portion may in particular be arranged on the edge of the recess and may, for example, form a type of flange or collar. In any case, the retention portion forms a positive-locking connection in the direction of the passage axis and thus prevents the respective gripping portion from being able to be pressed or pulled in this direction through the recess of the partition wall. The retention portion could also be referred to as a stop portion which during the assembly of the gripping unit forms a stop, by which it is determined how far the respective gripping portion can be introduced into the recess.

Each gripping portion may have a handling portion for a user which is connected to the retention portion and which in the assembled state can be reached via the access opening of the other gripping portion. The handling portion forms a region which is provided to be gripped by the user. That is to say, this handling portion is provided so that in this instance the introduction of force is carried out when the partition wall is gripped or transported by means of the gripping unit. In the assembled state, the handling portion can be reached via the access opening of the other gripping portion in each case. The user can consequently reach and grip through the access opening of the second (or first) gripping portion the handling portion of the first (or second) gripping portion. If he/she then applies a pulling force to the handling portion, this is directed away from the retention portion of the first (or second) gripping portion. As a result of the connection between the handling portion and the retention portion, the tensile force is transmitted to the retention portion. As a result of the positive-locking connection which the retention portion forms with the partition wall, the tensile force is introduced from the handling portion via the connection to the retention portion into the partition wall. That is to say, a connection between the two gripping portions is not loaded by this tensile force. The handling portion is preferably arranged in the direction of the passage axis with respect to the access opening of the gripping portion, it could also be said, when viewed from a surface of the partition wall, it is preferably arranged in the direction of the passage axis behind the access opening.

Each handling portion may be connected to the retention portion via side portions which adjoin each other at both sides in the direction of the axis of symmetry and which extend along the normal axis, wherein the side portions of the two gripping portions in the assembled state are at least partially in abutment with each other. The side portions adjoin the handling portion at both sides in the direction of the axis of symmetry. They extend along the normal axis and thus produce a connection between the retention portion and the handling portion. As a result of the side portions, there is already on the whole a structural stabilization which is further improved by the side portions of the two gripping portions being in abutment with each other. They may, in this instance, for example, form a positive-locking connection with each other, whereby on the whole the stability of the gripping unit is further improved.

According to an advantageous embodiment, each gripping portion has a covering portion which adjoins the access opening and which is arranged along the passage axis in front of the handling portion of the other gripping portion in each case and which at least covers it for the most part. The covering portion adjoins the access opening and normally adjoins the access opening in the direction of the minor axis. Along the passage axis, it is arranged in front of the handling portion of the other gripping portion in each case, wherein the indication "in front of" refers to the side of the gripping unit or the partition wall subassembly at which the access opening of the gripping portion to which the covering portion belongs is arranged. When viewed from the first side, the covering portion of the first gripping portion is arranged along the passage axis in front of the handling portion of the second gripping portion and, when viewed from the second side, the covering portion of the second gripping portion is arranged along the passage axis in front of the handling portion of the first gripping portion. When viewed along the passage axis, the covering portion covers the other handling portion at least for the most part. This prevents the user from unintentionally applying a pressing force to the other handling portion. Such a pressing force could not be transmitted by the retention portion of the other gripping portion to the partition wall, for which reason there would be the risk of the other gripping portion being pressed out of the recess. However, the covering portion shields the handling portion of the other gripping portion with respect to such pressing forces. The connection elements (clips/screws/hooks) of the two halves are thus loaded to the smallest possible extent, whether by tension or pressure. As long as a retention portion is present, the covering portion is at least indirectly connected to it and can in particular directly adjoin it. If the user applies a pressing force, for example, to the covering portion of the first gripping portion, this force can be transmitted by the retention portion of the first gripping portion to the partition wall. Preferably, the covering portion is in abutment with the handling portion of the other gripping portion in each case and can form a positive-locking connection therewith. Furthermore, the covering portion may have a projection which extends in the direction of the passage axis and which forms with the handling portion of the other gripping portion in each case a positive-locking connection in the direction of the minor axis.

In order to avoid errors during the assembly of the partition wall subassembly, it is preferable for each gripping portion to have a first orientation structure which, in the assembled state, engages with a complementary second orientation structure of the partition wall in order to determine an orientation of the gripping portion with respect to the partition wall. For example, it could be the case that the recess has a substantially rectangular cross-section so that the respective gripping units could be used in at least two (in the case of a square cross-section, even four) different orientations. In fact, for an ergonomic use normally precisely one orientation is optimal. In order to determine this, there is provided the first orientation structure which engages with the second orientation structure which is formed on the partition wall. Generally, the two orientation structures are constructed to complement each other and form a positive-locking connection with each other. Each of the orientation structures may be constructed as a single, local element or also have a plurality of elements which are spaced apart from each other.

In particular, the first orientation structure may have an orientation element which protrudes with respect to the retention portion in the direction of the passage axis and which engages in a complementary incision at the edge of the recess. The orientation element protrudes with respect to the retention portion in the direction of the passage axis and may in particular be directly connected to it. The orientation element may also be directly connected to the handling portion. These direct connections serve on the whole to provide better stability of the gripping portion and consequently the gripping unit as a whole. The orientation element may in particular be constructed in a ribbed manner, However, other, for example, pin-like embodiments would also be conceivable.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A partition wall subassembly having a gripping unit for a partition wall, comprising:
   first and second gripping portions which, in an assembled state, extend from mutually opposing sides into a recess of the partition wall which extends along a passage axis and are connected to each other within the recess, wherein the first and second gripping portions are constructed identically and, in the assembled state, arranged in a rotationally symmetrical manner with respect to an axis of symmetry, wherein first and second access openings are constructed in a non-symmetrical manner with respect to a center plane which is formed by the axis of symmetry and the passage axis.

2. The partition wall subassembly as claimed in claim 1, wherein the gripping portions are directly connected to each other in the assembled state.

3. The partition wall subassembly as claimed in claim 1, wherein the gripping portions are connected to each other in a non-positive-locking and/or positive-locking manner in the assembled state.

4. The partition wall subassembly as claimed in claim 1, wherein each of the first and second gripping portions has at least a pair of connection elements having a first connection element and a second opposing connection element with respect to the center plane, wherein in the assembled state a first connection element of the first gripping portion cooperates with a second connection element of the second gripping portion.

5. The partition wall subassembly as claimed in claim 1, wherein each of the first and second gripping portions has a retention portion which is arranged on a surface of the partition wall and which forms with the partition wall a positive-locking connection in the direction of the passage axis.

6. The partition wall subassembly as claimed in claim 5, wherein each of the first and second gripping portions has a handling portion for a user which is connected to the retention portion and which in the assembled state can be reached via the access opening of the other of the first and second gripping portion.

7. The partition wall subassembly as claimed in claim 6, wherein each handling portion is connected to the retention portion via side portions which adjoin at both sides in the direction of the axis of symmetry and which extend along the normal axis, wherein the side portions of the first and second gripping portions in the assembled state are at least partially in abutment with each other.

8. The partition wall subassembly as claimed in claim 7, wherein each of the first and second gripping portions has a covering portion which adjoins the respective first and second access openings and which is arranged along the passage axis in front of the handling portion of the other of the first and second gripping portions and which mostly covers the first and second gripping portions.

9. The partition wall subassembly as claimed in claim 8, wherein each of the first and second gripping portions has a first orientation structure which, in the assembled state, engages with a complementary second orientation structure of the partition wall in order to determine an orientation of each of the first and second gripping portions with respect to the partition wall.

10. The partition wall subassembly as claimed in claim 9, wherein the first orientation structure has an orientation element which protrudes with respect to the retention portion in the direction of the passage axis and which engages in a complementary incision at the edge of the recess.

11. The partition wall subassembly as claimed in claim 1, wherein the partition wall is an intermediate floor for a storage space of a motor vehicle.

12. A partition wall subassembly having a gripping unit for a partition wall for a storage space of a motor vehicle, comprising:
first and second gripping portions which, in an assembled state, extend from mutually opposing sides into a recess of the partition wall which extends along a passage axis and are connected to each other within the recess, wherein the first and second gripping portions are constructed identically and, in the assembled state, arranged in a rotationally symmetrical manner with respect to an axis of symmetry, wherein first and second access openings are constructed in a non-symmetrical manner with respect to a center plane which is formed by the axis of symmetry and the passage axis, wherein the gripping portions are directly connected to each other in the assembled state, wherein each of the first and second gripping portions has at least a pair of connection elements having a first connection element and a second opposing connection element with respect to the center plane, wherein in the assembled state a first connection element of the first gripping portion cooperates with a second connection element of the second gripping portion.

13. The partition wall subassembly as claimed in claim 12, wherein the gripping portions are connected to each other in a non-positive-locking and/or positive-locking manner in the assembled state.

14. The partition wall subassembly as claimed in claim 12, wherein each of the first and second gripping portions has a retention portion which is arranged on a surface of the partition wall and which forms with the partition wall a positive-locking connection in the direction of the passage axis.

15. The partition wall subassembly as claimed in claim 14, wherein each of the first and second gripping portions has a handling portion for a user which is connected to the retention portion and which in the assembled state can be reached via the access opening of the other gripping portion.

16. The partition wall subassembly as claimed in claim 15, wherein each handling portion is connected to the retention portion via side portions which adjoin at both sides in the direction of the axis of symmetry and which extend along the normal axis, wherein the side portions of the first and second gripping portions in the assembled state are at least partially in abutment with each other.

17. The partition wall subassembly as claimed in claim 16, wherein each of the first and second gripping portions has a covering portion which adjoins the respective first and second access openings and which is arranged along the passage axis in front of the handling portion of the other of the first and second gripping portions and which mostly covers the first and second gripping portions.

18. The partition wall subassembly as claimed in claim 17, wherein each of the first and second gripping portions has a first orientation structure which, in the assembled state, engages with a complementary second orientation structure of the partition wall in order to determine an orientation of each of the first and second gripping portions with respect to the partition wall.

19. The partition wall subassembly as claimed in claim 18, wherein the first orientation structure has an orientation element which protrudes with respect to the retention portion in the direction of the passage axis and which engages in a complementary incision at the edge of the recess.

20. The partition wall subassembly as claimed in claim 12, wherein the partition wall is an intermediate floor for the storage space of the motor vehicle.

* * * * *